US008661378B2

(12) United States Patent
Manohar et al.

(10) Patent No.: US 8,661,378 B2
(45) Date of Patent: Feb. 25, 2014

(54) ASYCHRONOUS SYSTEM ANALYSIS

(75) Inventors: Rajit Manohar, Ithaca, NY (US); Gael Paul, Aix-en-Provence (FR); Raymond Nijssen, San Jose, CA (US); Marcel Van der Goot, Pasadena, CA (US); Clinton W. Kelly, San Jose, CA (US); Virantha Ekanayake, San Jose, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 254 days.

(21) Appl. No.: 12/570,629

(22) Filed: Sep. 30, 2009

(65) Prior Publication Data

US 2011/0078644 A1    Mar. 31, 2011

(51) Int. Cl.
*G06F 17/50* (2006.01)

(52) U.S. Cl.
USPC .......................................................... 716/103

(58) Field of Classification Search
USPC ................................. 716/100–139
See application file for complete search history.

(56) References Cited

U.S. PATENT DOCUMENTS

| | | | |
|---|---|---|---|
| 6,301,655 B1 | 10/2001 | Manohar et al. | |
| 6,381,692 B1 | 4/2002 | Martin et al. | |
| 6,658,550 B2 | 12/2003 | Martin | |
| 6,690,203 B2 | 2/2004 | Nystrom et al. | |
| 7,157,934 B2 | 1/2007 | Teifel et al. | |
| 7,610,567 B2 | 10/2009 | Manohar | |
| 7,617,470 B1 * | 11/2009 | Dehon et al. | 716/116 |
| 8,051,396 B2 | 11/2011 | Beerel et al. | |
| 8,065,647 B2 | 11/2011 | Stevens | |
| 8,453,079 B2 | 5/2013 | Manohar | |
| 2002/0156995 A1 | 10/2002 | Martin et al. | |
| 2002/0166003 A1 | 11/2002 | Nystrom et al. | |
| 2004/0073876 A1 * | 4/2004 | Khalil et al. | 716/6 |
| 2004/0111686 A1 * | 6/2004 | Chang et al. | 716/6 |
| 2005/0039094 A1 * | 2/2005 | Yan | 714/726 |
| 2005/0160392 A1 | 7/2005 | Sandbote | |
| 2006/0075210 A1 | 4/2006 | Manohar et al. | |
| 2006/0120189 A1 | 6/2006 | Beerel et al. | |
| 2006/0233006 A1 | 10/2006 | Fant | |
| 2007/0200608 A1 | 8/2007 | Fang et al. | |
| 2007/0253240 A1 | 11/2007 | Manohar et al. | |
| 2007/0256038 A1 * | 11/2007 | Manohar | 716/3 |
| 2007/0262786 A1 | 11/2007 | Manohar et al. | |
| 2009/0319962 A1 | 12/2009 | Manohar | |

FOREIGN PATENT DOCUMENTS

| | | | |
|---|---|---|---|
| KR | 101061864 | | 9/2011 |
| WO | WO-2007127914 A3 | | 11/2007 |

OTHER PUBLICATIONS

Cassia et al., "Synchronous-to-Asynchronous Conversion of Cryptographic Circuits", Journal of Circuits, Systems, and Computers, vol. 18, No. 2, Apr. 2009.*

"International Application Serial No. PCT/US07/67618, Written Opinion mailed Feb. 22, 2008", 4 pgs.

(Continued)

*Primary Examiner* — Vuthe Siek
*Assistant Examiner* — Aric Lin
(74) *Attorney, Agent, or Firm* — Schwegman Lundberg & Woessner, P.A.

(57) ABSTRACT

Methods, systems, and circuits that implement timing analyses of an asynchronous system are described. A method may include converting a synchronous circuit design into an asynchronous representation, wherein a critical path may be identified. The critical path may be converted to a corresponding path in the synchronous circuit design. Additional methods, systems, and circuits are disclosed.

26 Claims, 5 Drawing Sheets

(56) References Cited

OTHER PUBLICATIONS

"International Application Serial No. PCT/US2007/067618, International Search Report mailed Feb. 22, 2008", 1 pg.

Branover, A., et al., "Asynchronous Design by Conversion: Converting Synchronous Circuits into Asynchronous Ones", Proceedings of the Design, Automation and Test in Europe Conference and Exhibition, (2004), 6 pgs.

"International Application Serial No. PCT/US2007/067618, International Preliminary Report on Patentability mailed Nov. 6, 2008", 7 pgs.

"Korean Application No. 10-2008-7029013, Office Action Response Filed Nov. 1, 2010", w/English translation, 11 pgs.

"U.S. Appl. No. 11/740,184, Response filed Feb. 19, 2009 to Non-Final Office Action mailed Nov. 19, 2008", 14 pgs.

"U.S. Appl. No. 11/740,184, Non-Final Office Action mailed Nov. 19, 2008", 14 pgs.

"U.S. Appl. No. 11/740,184, Notice of Allowance mailed Jun. 15, 2009", 4 pgs.

Amde, M., et al., "Automating the Design of an Asynchronous DLX Microprocessor", *DAC* (2003), 502-507 pgs.

Blunno, J. C, et al., "Handshake protocols for de-synchronization", *Proc. Of ASYNC'04*, (2004), 10 pgs.

Branover, A., et al., "Asynchronous Design by Conversion: Converting Synchronous Circuits into Asynchronous Ones", *Proc. of Date '04*, (2004), 06 pgs.

Mercer, E. G, et al., "Stochastic cycle period analysis in timed circuits", The 2000 IEEE International Symposium on Circuits and Systems, 2000. Proceedings. ISCAS 2000 Geneva. vol. 2, (2000), 172-175.

Mercer, Eric, et al., "Stochastic cycle period analysis in timed circuits", *University of Utah Masters Thesis*, Electrical Engineering Department, University of Utah, (May 1999), 78 pgs.

Peng, Song, et al., "Automated synthesis for asynchronic FPGAs", *Published in Symposium on Field Programmable Gate Arrays*; Computer Systems Laboratory, Cornell University, Ithaca NY, 11 pgs.

Teifel, John, et al.,"Static Tokens: Using Dataflow to Automate Concurrent Pipeline Synthesis", *In 10th Int'l Symposium on Advanced Research in In Asynchronous Circuits and Systems*, pp. 17-27, Computer Systems Laboratory, Cornell University, Ithaca, NY, (Apr. 2004), 11 pgs.

"U.S. Appl. No. 12/550,582, Non Final Office Action mailed Sep. 15, 2011", 13 pgs.

"U.S. Appl. No. 12/550,582, Response filed Jan. 13, 2012 to Non Final Office Action mailed Sep. 15, 2011", 14 pgs.

"U.S. Appl. No. 12/550,582, Final Office Action mailed Feb. 10, 2012", 12 pgs.

"U.S. Appl. No. 12/550,582, Notice of Allowance mailed May 25, 2012", 5 pgs.

"U.S. Appl. No. 12/550,582, Response filed Apr. 10, 2012 to Final Office Action mailed Jan. 10, 2012", 10 pgs.

"European Application Serial No. 07761443.6, Extended Search Report mailed May 4, 2012", 11 pgs.

"Japanese Application Serial No. 2009-507982, Office Action mailed Dec. 20, 2011", 7 pgs.

Cortadella, Jordi, et al., "Lazy Transition Systems and Asynchronous Circuit Synthesis With Relative Timing Assumptions", IEEE Transactions on Computer-Aided Design of Integrated Circuits and Systems 21(2), (Feb. 2002), 22 pgs.

Teifel, John, et al., "An Asynchronous Dataflow FPGA Architecture", IEEE Transactions on Computers 53(11), (Nov. 1, 2004), 1376-1392.

"U.S. Appl. No. 12/550,582, Notice of Allowance mailed Sep. 18, 2012", 6 pgs.

"U.S. Appl. No. 12/550,582, Notice of Allowance mailed Jan. 24, 2013", 5 pgs.

\* cited by examiner

ASYCHRONOUS SYSTEM ANALYSIS

BACKGROUND

Traditional synchronous circuit designs may be represented using a variety of description languages, netlists, and schematics. All of these synchronous representations may define functionality of the circuits in the presence of one or more timing signals used to synchronize operations. Synchronous operations have several advantages, including deterministic behavior, simplified design/testing, and portability. However, there are also occasions when the use of asynchronous operation is desirable.

BRIEF DESCRIPTION OF THE DRAWINGS

Some embodiments of the disclosed technology are illustrated by way of example and not limitation in the figures of the accompanying drawings in which.

DETAILED DESCRIPTION

Example methods, systems, and circuits that operate to analyze asynchronous systems, including an analysis of their timing characteristics, will now be described. In the following description, numerous examples having example-specific details are set forth to provide an understanding of example embodiments. It will be evident, however, to one of ordinary skill in the art, after reading this disclosure, that the present examples may be practiced without these example-specific details, and/or with different combinations of the details than are given here. Thus, specific embodiments are given for the purpose of simplified explanation, and not limitation.

Some embodiments described herein include a method comprising associating one or more data tokens (described below) with a clock domain of a multi-clock domain netlist. The method may include converting a synchronous circuit design into an asynchronous representation, where a critical path may be identified. The critical path may then be converted to a corresponding path in the synchronous circuit design. In an embodiment, the corresponding path may be reported as an unacceptable path.

Embodiments of systems and methods that operate to convert a synchronous circuit representation to and from an asynchronous circuit representation have been previously disclosed (in co-pending patent application Ser. No. 11/740,184, entitled "Systems and Methods for Performing Automated Conversion of Representations of Synchronous Circuit Designs to And from Representations of Asynchronous Circuit Designs," commonly assigned to the assignee of the embodiments described herein, filed on Apr. 25, 2007, and incorporated herein by reference in its entirety, referred to hereafter as "PA184"). A method to accomplish this conversion will now be briefly described.

In some embodiments, the method operates to receive a description of a synchronous netlist with additional information that can be used for design synthesis. The additional information, for example, may be related to a set of clock signals and their operating frequencies (or even a single clock signal, without noting the frequency), a set of multi-cycle paths (if present), and constraints on input and output signals with respect to appropriate clocks. In addition, any signal that is to remain synchronous may also be specified. In some embodiments, it may be assumed that all primary inputs and outputs are synchronous.

The synchronous netlist may contain one or more sets of gates that form combinational logic, and one or more sets of state-holding elements that form state-holding logic. Among others, these can include four types of the state-holding elements: positive edge-triggered flip-flops (PFLOPs), negative edge-triggered flip-flops (NFLOPs), latches that are transparent when their clock input is high (PLATCH), and latches that are transparent when their clock input is low (NLATCH).

The synchronous netlist may be converted to an asynchronous representation, or target netlist, using the synchronous to asynchronous conversion method described in PA184. The asynchronous implementation may be equivalent to the synchronous one in terms of computations performed by the implementations (e.g., by a field-programmable gate array (FPGA)). The conversion method may include generating annotations that translate the performance characteristics of the asynchronous implementation back into the synchronous domain using an annotation generator (see PA184).

The target asynchronous netlist may, for example, represent circuits that can be implemented efficiently as fine-grained asynchronous pipelines. The target asynchronous netlist may represent an asynchronous dataflow graph. Nodes in the dataflow graph may operate on data values, referred to as data tokens, that may comprise a data item that can flow through an asynchronous pipeline. A data token can have a one-bit value or a multi-bit value. Operators in the dataflow graph may receive data tokens on their inputs and produce data tokens on their outputs. Changes in the value of data tokens may be used to compute results.

In some embodiments, connectivity between operators may be specified by arrows, which correspond to communication channels along which tokens can be sent and received. Communication channels may be buffered or not, and sending and receiving a token on a channel may correspond to rendezvous synchronization. In a synchronous to asynchronous conversion method, each signal may be mapped to a clock edge in the dataflow graph, and different gates from the synchronous netlist may be translated into dataflow operators.

A property preserved by the method of PA184 addresses the correspondence between tokens and clock edges. For each clock domain, the value of a signal during clock cycle number k may correspond to the value of the asynchronous data token on the corresponding asynchronous channel that has sequence number k. In the presence of clock gating, this relationship may become more complicated, depending on when the clock domain is gated, if at all. In the following description, asynchronous signals (i.e., data tokens) may be referred to as forming part of a clock domain when their corresponding synchronous signals belong to that same clock domain.

Some embodiments of the invention described herein relate to analyzing the performance of an asynchronous representation that corresponds to a synchronous circuit design. For example, critical paths in the asynchronous representation may be identified as bottlenecks by performing a timing analysis in the asynchronous domain. To remove the bottlenecks in the original synchronous circuit design, the critical paths may then be converted to corresponding paths in the synchronous circuit design. This conversion may be beneficial, because the circuit designer who provided the synchronous circuit design may not have any knowledge about the asynchronous implementation of the synchronous circuit design. In addition, the identified bottlenecks in the asynchronous representation may or may not be different from the bottlenecks that limit the operation of the synchronous circuit design.

Figure 1:
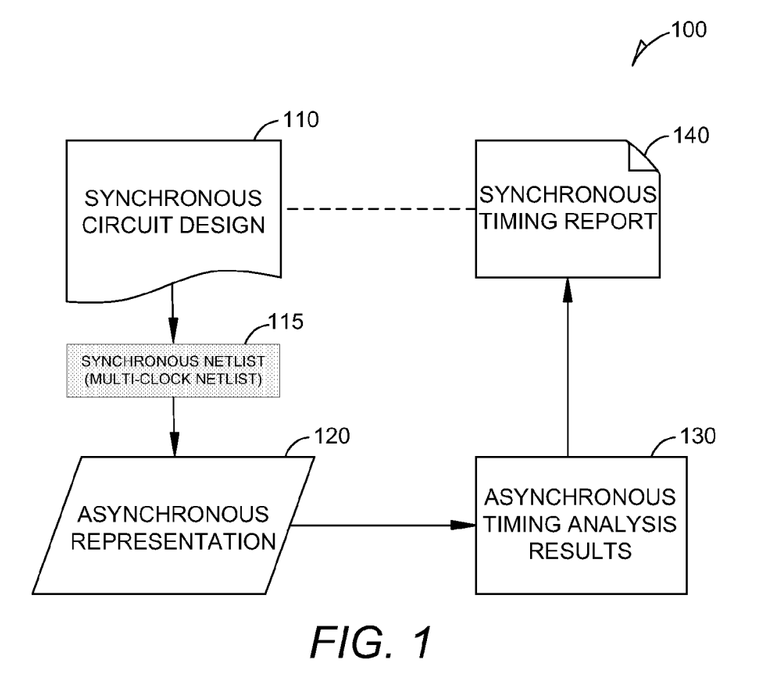
FIG. 1 illustrates a work flow scheme for implementing a performance analysis of an asynchronous system, according to various embodiments of the invention.

FIG. 1 illustrates a work flow scheme 100 for implementing a performance analysis of an asynchronous system, according to various embodiments of the invention of the invention. The scheme 100 may comprise a synchronous circuit design 110, perhaps comprising an integrated circuit (e.g., an FPGA) including a number of logic gates such as combinational logic gates and/or state-holding elements (such as flip-flops). The synchronous circuit design 110 may be used to generate a synchronous netlist 115. The synchronous netlist 115 generated from the synchronous circuit design 110 may be converted to an asynchronous representation 120 corresponding to the synchronous circuit design 110, as described in PA184. The asynchronous representation 120 may comprise dataflow graphs including dataflow blocks 300 described below with respect to FIG. 3. Those of ordinary skill in the art will realize that other representations are possible.

The performance (e.g., speed, timing behavior, and so on) of an asynchronous design represented by the asynchronous representation 120 may be analyzed using the timing analysis system 200 shown in FIG. 2 and described below. Timing analysis may comprise identifying one or more critical paths such as the critical path 400 shown in FIG. 4. An asynchronous timing analysis result 130 may comprise the identification of one or more critical paths. Identifying the critical path 400 may comprise identifying a "slowest path" in the asynchronous representation. The "slowest path" may be considered as a signal path which is either substantially long or substantially short, as will be described in more detail below.

Figure 4:
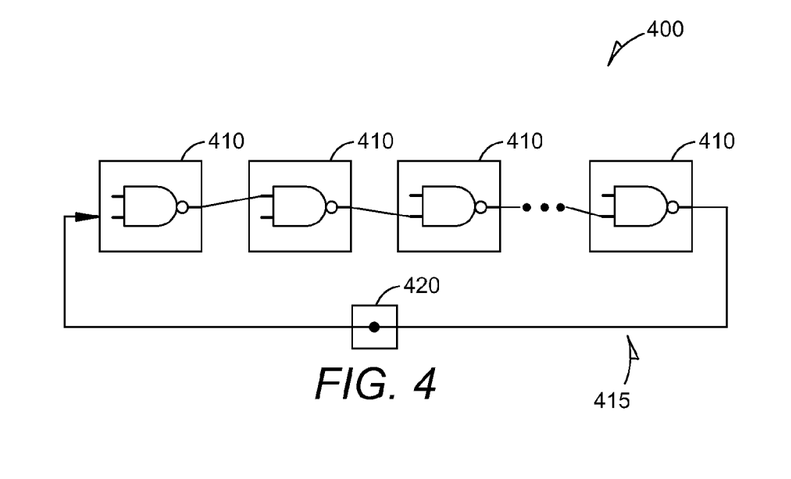
FIG. 4 is a graphical representation of a critical path in an asynchronous representation, according to various embodiments of the invention.

The critical path may cause a bottleneck in computations implemented by the asynchronous design. Since a synchronous designer may not be familiar with the asynchronous representation 120, a report of one or more bottlenecks may be prepared in the synchronous domain for the synchronous designer to modify the synchronous circuit design 110. The report in the form of a synchronous timing report 140 may provide a converted version of the critical path 400 into a corresponding synchronous path (e.g., the corresponding path 500 shown in FIG. 5) in the synchronous circuit design 110.

In some embodiments, when the synchronous circuit design 110 comprises multiple clock domains, the synchronous netlist 115, generated from the synchronous circuit design 110, may comprise a multi-clock netlist. The multi-clock netlist may include several portions, each one corresponding to a different clock domain. Each clock domain may be characterized by a clock signal which may be used to synchronize timing associated with one or more state-holding elements in the clock domain.

Two or more of the multi-clock netlists may comprise "unrelated" clock signals. Clock signals are considered to be "unrelated," for example, when they do not have a repeating period that corresponds to a least common multiple of the cycle times of the clock signals; or the repeating period is substantially large. For the purpose of this disclosure, the repeating period is "substantially large" when it is larger than a predefined threshold value or is at least 10 times larger than that of the largest of the clock periods in the domains being considered.

Figure 2:
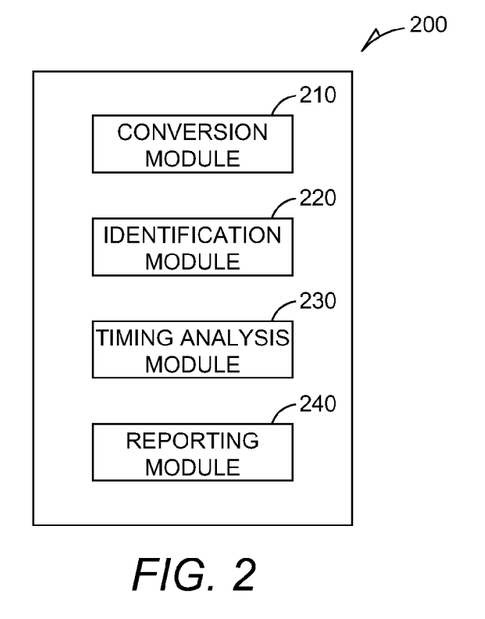
FIG. 2 is a block diagram of a timing analysis system, according to various embodiments of the invention.

FIG. 2 is a block diagram of a timing analysis system 200, according to various embodiments of the invention. The timing analysis system 200 may include a conversion module 210, an identification module 220, a timing analysis module 230, and a reporting module 240. These modules may be implemented in hardware and/or software. The software (e.g., instructions 724 shown in FIG. 7) may be stored in memory (e.g., memory 770 shown in FIG. 7) and be executed by one or more processors (e.g., processor 760 shown in FIG. 7). In some embodiments, one or more memories and/or processors may be included in the timing analysis system 200.

The conversion module 210 may operate to convert the synchronous circuit design 110 of FIG. 1 into the asynchronous representation 120 of FIG. 1. Converting of the circuit design 110 into the asynchronous representation 120 may comprise generating the synchronous netlist 115 of FIG. 1. The conversion module 210 may then operate to convert the synchronous netlist 115 into a corresponding dataflow graph, as disclosed in PA184. The asynchronous representation 120 of FIG. 1 may thus comprise a corresponding dataflow graph.

The conversion module 210 may operate to convert the synchronous netlist 115 into the asynchronous representation 120, using a method disclosed in PA 184. The asynchronous representation 120 may comprise one or more dataflow graphs (e.g., as shown and described in PA 184). Each dataflow graph may comprise dataflow blocks (e.g., dataflow blocks 300 shown in FIG. 3) representing various components of the synchronous circuit design 110 (e.g., combination logic gates and state-holding elements).

The identification module 220 may operate to identify a critical path in the asynchronous representation that includes dataflow graphs. For example, the identification module 220 may identify the "slowest path" in the asynchronous representation (e.g., the critical path 400 shown in FIG. 4). In some embodiments, the identification module 220 may identify the slowest path by using techniques to analyze the asynchronous representation that are well known to a person of ordinary skill in the art. Such techniques may include, inter alia, Petri net, marked graphs, and event-rule system techniques.

In an embodiment, the timing analysis module 230 may operate to perform a timing analysis of the asynchronous representation 120 to identify the critical path. The timing analysis module 230 may operate to analyze the asynchronous representation 120 at a higher level of abstraction than that performed by the above techniques (i.e., the Petri net, marked graphs, and event-rule system techniques). For example, the timing analysis module 230 may perform the timing analysis at a pipelined stage level. At this level, critical paths may correspond to loops of dataflow blocks as shown in the critical path 400 shown in FIG. 4. Details of the timing analysis at the pipelined stage level are well known to a person of ordinary skill in the art, and will therefore not be described further here.

Reporting of the critical path in the asynchronous representation 120 of FIG. 1 to a circuit designer (e.g., the circuit designer of the synchronous circuit design 110 of FIG. 1) who may be unfamiliar with the asynchronous representation 120, may be problematic due to a lack of knowledge on the designer's part, etc. Thus, the conversion module 210 may operate to convert the identified critical path in the asynchronous representation 120 into a corresponding synchronous path (e.g., the corresponding path 500 shown in FIG. 5). The corresponding path may or may not represent a bottleneck in the synchronous circuit design 110 of FIG. 1.

Figure 5:
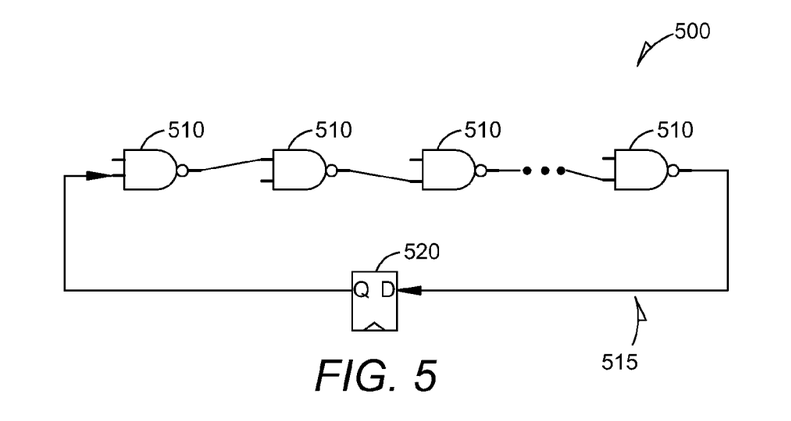
FIG. 5 is a graphical representation reporting a synchronous path that corresponds to the critical asynchronous path of FIG. 4, according to various embodiments of the invention.

The reporting module 240 may report the corresponding path 500 as an unacceptable path to the circuit designer and/or the conversion module 220 for modification. The reporting module may, for example, use the video display unit 710 of FIG. 7 to display the corresponding path 500 the circuit designer. In an embodiment, the reporting module 240 may use the network interface device 790 and the network 782 (e.g., the Internet) of FIG. 7 to communicate the corresponding path 500 to the circuit designer.

Figure 3:
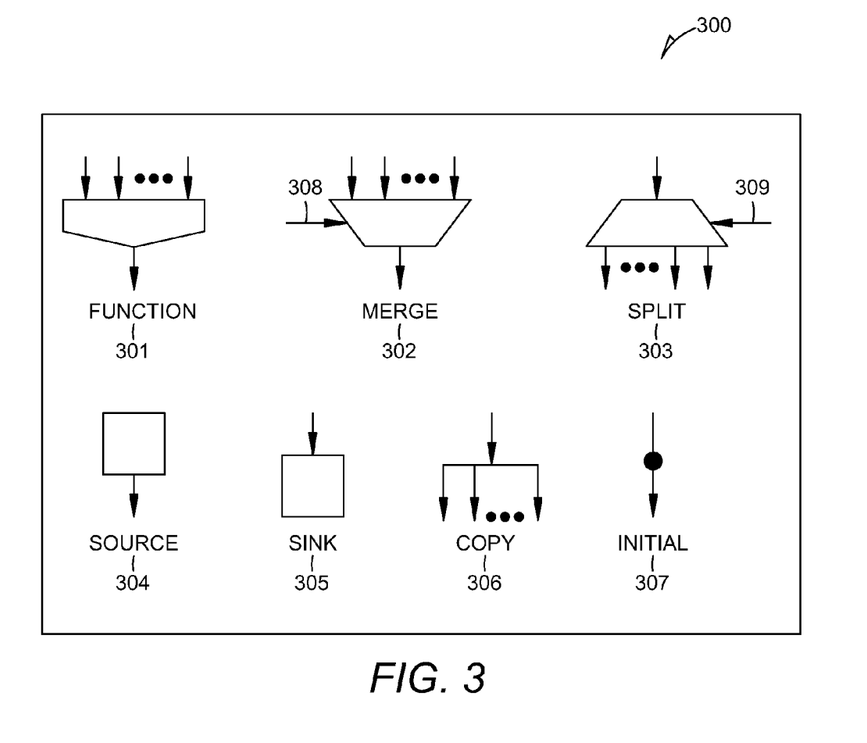
FIG. 3 is a block diagram of dataflow blocks used in a dataflow diagram representing an asynchronous system, according to various embodiments of the invention.

FIG. 3 is a block diagram of dataflow blocks 300 used in a dataflow diagram representing an asynchronous system, according to various embodiments of the invention. The asynchronous system may include the synchronous circuit design 110 of FIG. 1. The synchronous circuit design 110 may comprise an integrated circuit (e.g., an FPGA) including a number of logic gates such as combinational logic gates and/or state-holding elements (such as flip-flops).

As is well known to those of ordinary skill in the art, a dataflow diagram may comprise a graphical representation of the flow of data tokens through an asynchronous system including an asynchronous design (e.g., the asynchronous design represented by the asynchronous representation 120 of FIG. 1). In this case, the dataflow diagram may comprise one or more dataflow blocks 300 that can be used to convert between a synchronous design (e.g., the synchronous circuit design 110 of FIG. 1) and a corresponding asynchronous implementation (e.g., the asynchronous representation 120 of FIG. 1).

For example, a function block 301 may have an arbitrary number of inputs and one output. The function block 301 may receive tokens from at least some of its inputs, compute a specified function, and produce the result of the function as an output token on its output. There can be many different types of function blocks that vary in the number of inputs they have, and in the operations they perform. A source block 304 may comprise an operator that generates an infinite stream of tokens on its output that always have the same value. A sink block 305 may comprise an operator that consumes any input token.

A copy block 306 is block that can replicate the token received on its input to all its outputs. An initial block 307 may operate by first transmitting a token on its output, and thereafter copying any input token to its output. The blocks 301, 304, 305, 306, and 307 may repeatedly receive tokens on their respective inputs, and send tokens on their respective outputs.

The merge block 302 has two types of inputs: data inputs (like every other block), and a control input 308. The value of the control input 308 may specify the data input from which a token can be received. This token may then be sent on the output of the merge block 302.

A split block 303 has a dual function. It may receive a control value on its control input 309, and a data value on its data input. It may operate to send the data value on the output channel specified by the value of the control input 309.

FIG. 4 is a graphical representation of a critical path 400 in an asynchronous representation 120 of FIG. 1, according to various embodiments of the invention. The identification module 220 of FIG. 2 may operate to analyze the timing performance of the asynchronous representation 120. As described above, for the analysis, the identification module 220 may use well known techniques such as Petri net, marked graphs, and event-rule system techniques. The timing analysis module 230 of FIG. 2 may operate to analyze the asynchronous representation 120 at a higher level of abstraction than that performed by these techniques.

For example, the timing analysis module 230 may operate to perform the timing analysis at a pipelined stage level. When the asynchronous representation 120 is based on a multi-clock domain synchronous circuit design 110 of FIG. 1, the timing analysis module 230 may perform either a separate timing analysis for each clock domain or perform a joint timing analysis, in case the clock domains of the multi-clock domain are "related". The "related" clock domains may be considered as clock domains with clock periods of their associated clock signals that are rational multiples of each other. The timing analysis of the asynchronous representation 120 performed by the timing analysis module 230 may identify a critical path 400. The critical path 400 may be identified as the slowest path in the asynchronous dataflow graph associated with the asynchronous representation 120. The slowest path (i.e. the critical path 400) can limit the rate at which data tokens flow through the asynchronous dataflow graph associated with the asynchronous representation 120.

The critical path 400 may include a loop 415 formed, for example, by a chain of dataflow blocks 410 (indicated with boxes around two-input gates) and an initial block 420. The dataflow blocks 410 and the initial block 420 may represent two-input gates and a state-holding element, respectively. Asynchronous channels implemented by using handshake protocols may couple the dataflow blocks 410 and the initial block 420 together. The timing analysis module 230 may perform the timing analysis at the individual gate level. In that case, the timing analysis report may be more detailed, but can often be simplified into a pipelined stage level report.

The critical path 400 may, for example, form a bottleneck in the path of data tokens moving forward through the loop 415 because it includes a substantially "long" or a substantially "short" path. The substantially "long" path may be considered a path that causes data tokens to experience an unacceptably long delay. The delay is unacceptably long when it is, for example, longer than a predefined number of clock periods (e.g., ten clock periods) associated with a clock signal used by the state-holding element that corresponds to the initial block 420 (e.g., an state-holding element 520 shown in FIG. 5).

A substantially "short" path may be considered, for example, as a path that data tokens can pass through in less than a clock period associated with the clock signal used by the state-holding element that corresponds to the initial block 420 (e.g., a state-holding element 520 shown in FIG. 5). In an embodiment, the substantially short path may result in a bottleneck by causing "holes" in the loop 415 moving backward slowly. For the purpose of this disclosure, a "hole" may be considered as a lack of a data token in a particular position (e.g., at the output of the initial block 420) in the loop 415. That is, a hole is a position along a path that might otherwise be occupied by a data token, but is not. Holes moving backward slowly along a selected path may indicate data token congestion, which limits the performance of the loop being analyzed. One may consider the analogy of a traffic light and traffic flow. When the traffic light is green for a substantially short or a substantially long time, it causes traffic congestion.

In some embodiments, situations such as imbalanced path lengths may also affect timing performance. For example, when two parallel paths (e.g., between the output of a dataflow block and the input of another dataflow block) are not balanced in terms of latencies, a bottleneck situation may arise. The imbalanced paths may, for example, include a different number of dataflow blocks in each path. When any of the above-described bottlenecks, such as the critical path 400, is encountered in the asynchronous representation 120 of FIG. 1, it may be reported by the reporting module 240 of FIG. 2 to the circuit designer. The circuit designer may act to modify the corresponding path 500 shown in FIG. 5, in order to alleviate the bottleneck condition.

FIG. 5 is a graphical representation reporting a synchronous path 500 that corresponds to the critical asynchronous path 400 of FIG. 4, according to various embodiments of the invention. The critical path 400 of FIG. 4 as presented in an asynchronous representation (such as the asynchronous representation 120 of FIG. 1) that may not be useful for the circuit designer of the synchronous circuit design 110 of FIG. 1. To report the critical path 400 in the synchronous domain, the correspondence between the synchronous circuit design 110 and the asynchronous representation 120 can be used. The conversion module 210 of FIG. 2 may operate to convert the critical path 400 to the corresponding path 500.

The corresponding path 500 may comprise a loop 515 formed by a chain of synchronous gates 510, and the state-holding element 520. The synchronous gates 510 and the state-holding element 520 may correspond to the dataflow blocks 410 and the initial block 420 of FIG. 4, respectively. The corresponding path 500 may be reported to the circuit designer as an unacceptable path that failed the timing performance requirements of the corresponding asynchronous representation 120, perhaps as being a substantially "long" or a substantially "short" path, as described above with respect to FIG. 4. The corresponding path 500 may or may not comprise a critical path (e.g., a path causing a bottleneck) in the synchronous domain.

Figure 6:
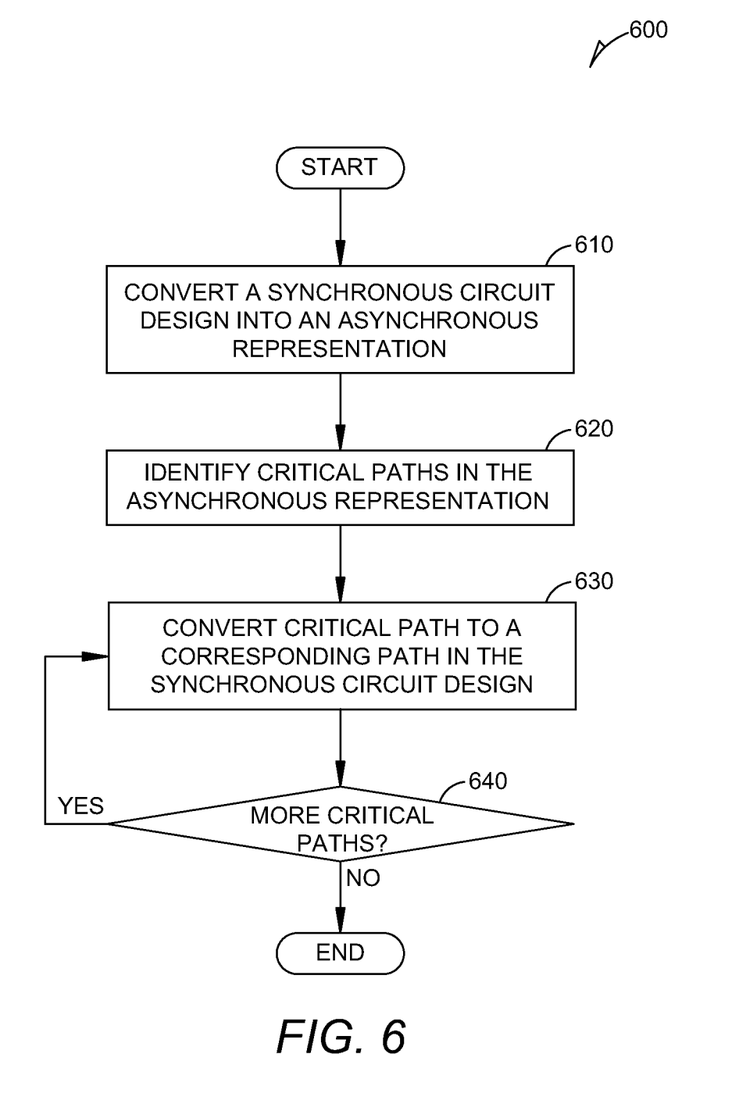
FIG. 6 is a flow diagram illustrating a method of analyzing an asynchronous system, according to various embodiments of the invention.

FIG. 6 is a flow diagram illustrating a method 600 of analyzing an asynchronous system, according to various embodiments of the invention. The asynchronous system may comprise the synchronous circuit design 110 of FIG. 1. The method may start at operation 610, where the conversion module 210 of FIG. 2 converts the synchronous circuit design 110 of FIG. 1 into the asynchronous representation 120 of FIG. 1, as described with respect to FIG. 2.

At operation 620, the identification module 220 of FIG. 2 may identify the critical path 400 of FIG. 4 in the asynchronous representation 120. For example, the identification module 220 may identify the slowest path in the asynchronous representation 120 (e.g., the critical path 400). In some embodiments, the identification module 220 may identify the critical path by using techniques well known to those of ordinary skill in the art, such as Petri net, marked graphs, and event-rule system techniques. In some embodiments, the timing analysis module 230 of FIG. 2 may perform a timing analysis resulting in identification of the critical path 400.

At operation 630, the conversion module 210 may convert the critical path 400 into the corresponding path 500 of FIG. 5. The corresponding path 500 may be modified by the circuit designer to mitigate the bottleneck arising from the critical path 400. The critical path 400 may comprise a slowest path in the asynchronous representation 120. The corresponding path 500 may or may not comprise a critical path (causing a bottleneck) in the synchronous domain.

At operation 640, if there are more asynchronous critical paths (e.g., critical path 400 of FIG. 4), control may be passed to operation 630 to convert them to corresponding paths in the synchronous domain. Otherwise the method may terminate.

Figure 7:
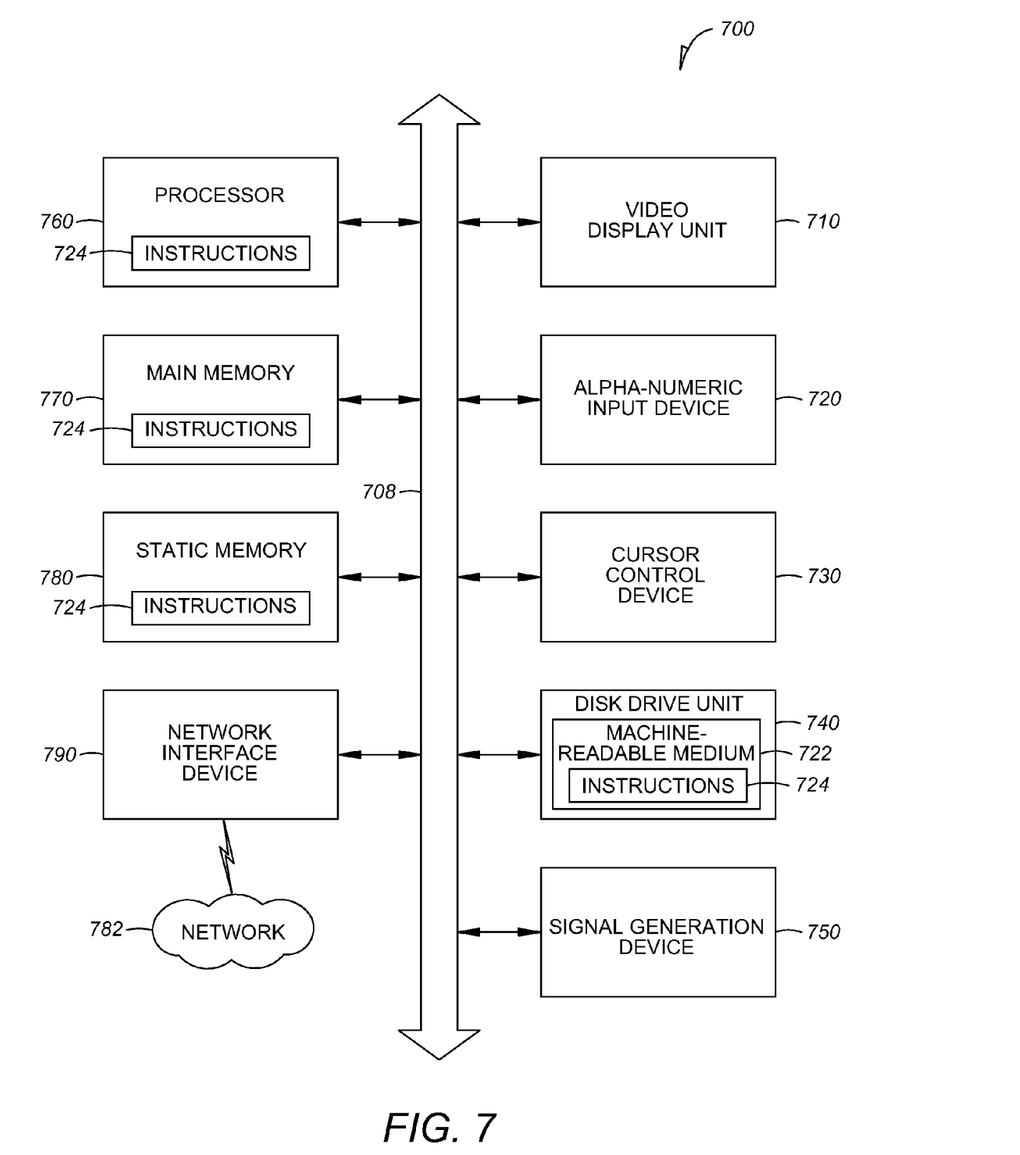
FIG. 7 is a block diagram of a machine, according to various embodiments of the invention.

FIG. 7 is a block diagram of a machine 700, according to various embodiments of the invention. The machine 700 may comprise a set of instructions that can be executed to cause the machine 700 to perform any one or more of the methodologies discussed herein. In alternative embodiments, the machine 700 may operate as a standalone device or may be connected (e.g., networked) to other systems. In a networked deployment, the machine 700 may operate in the capacity of a server or a client system in a server-client network environment or as a peer system in a peer-to-peer (or distributed) network environment. Machine 700 may be realized as a specific machine in the form of a computer, comprising a system similar to or identical to the timing analysis system 200 of FIG. 2. Further, any of the elements of machine 700 (e.g., the processor 760 or the memory 770, among others) may include the timing analysis system 200.

The machine 700 may comprise a server computer, a client computer, a personal computer (PC), a tablet PC, an integrated circuit, an asynchronous FPGA, or any system capable of executing a set of instructions (sequential or otherwise) that specify actions to be taken by that system. Further, while only a single machine is illustrated, the term "machine" shall also be taken to include any collection of systems that individually or jointly execute a set (or multiple sets) of instructions to perform any one or more of the methodologies discussed herein.

The example machine 700 may include a processor 760 (e.g., a central processing unit (CPU), a graphics processing unit (GPU) or both), a main memory 770 and a static memory 780, all of which communicate with each other via a bus 708. The machine 700 may further include a video display unit 710 (e.g., a liquid crystal display (LCD) or cathode ray tube (CRT)). The machine 700 also may include an alphanumeric input device 720 (e.g., a keyboard), a cursor control device 730 (e.g., a mouse), a disk drive unit 740, a signal generation device 750 (e.g., a speaker), and a network interface device 790.

The disk drive unit 740 may include a machine-readable medium 722 on which may be stored one or more sets of instructions (e.g., software) 724 embodying any one or more of the methodologies or functions described herein. The instructions 724 may also reside, completely or at least partially, within the main memory 770 and/or within the processor 760 during execution thereof by the machine 700, with the main memory 770 and the processor 760 also constituting machine-readable media. The instructions 724 may further be transmitted or received over a network 782 via the network interface device 790.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any one or more of the methodologies of the present technology. The term "machine-readable medium" shall accordingly be taken to include, but not be limited to, tangible media, including solid-state memories and optical and magnetic media.

Various embodiments related to implementing analysis of an asynchronous system, including timing analyses, have been described. The embodiments may enable synchronous circuit designers dealing with asynchronous systems (e.g., an asynchronous FPGA), who are not familiar with asynchronous representations, to improve design performance by making modifications in the synchronous domain, rather than in the asynchronous domain. Although example embodiments have been described, it will be evident, after reading this disclosure that various modifications and changes may be made to these embodiments. Accordingly, the specification and drawings are to be regarded in an illustrative rather than a restrictive sense.

The abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A processor-implemented method to execute on one or more processors that perform the method comprising:
   using the one or more processors coupled to a memory and a display device to perform at least a portion of one or more of
   converting a synchronous netlist generated from a synchronous circuit design comprising an integrated circuit into an asynchronous representation corresponding to the synchronous circuit design, the asynchronous representation including a dataflow graph;
   identifying a critical path in the asynchronous representation by performing a timing analysis on one or more paths in the dataflow graph to determine the critical path;
   converting the critical path into a corresponding path in the synchronous circuit design; and
   displaying the corresponding path on the display device.

2. The method of claim 1, wherein converting the critical path comprises generating a synchronous netlist based on the synchronous circuit design.

3. The method of claim 2, wherein the converting further comprises converting the synchronous netlist to the dataflow graph.

4. The method of claim 2, wherein the synchronous netlist comprises a multi-clock domain synchronous netlist.

5. The method of claim 2, wherein the synchronous netlist comprises a multi-clock domain synchronous netlist that comprise unrelated clock signals.

6. The method of claim 1, wherein the critical path corresponds to one of a substantially short path in the dataflow graph, a substantially long path in the dataflow graph, or a substantially imbalanced path the dataflow graph.

7. The method of claim 1, wherein the identifying of the critical path comprises identifying a slowest path in the dataflow graph.

8. The method of claim 7, wherein the one or more paths in the dataflow graph includes one or more loops, and the slowest path comprises a loop.

9. The method of claim 1, wherein the corresponding path comprises a portion of the synchronous circuit design including multiple synchronous gates and at least one flip-flop.

10. The method of claim 1, wherein the performing of the timing analysis includes analyzing flows of data tokens in the dataflow graph.

11. The method of claim 10, wherein the performing of the timing analysis comprises analyzing the asynchronous representation at an asynchronous pipeline level.

12. The method of claim 10, wherein the performing of the timing analysis comprises analyzing the asynchronous representation using a technique inc hiding at least one of a Petri net, a marked graphs, or an event-rule system technique.

13. The method of claim 10, wherein the synchronous circuit design comprises multi-clock domains, and wherein the performing of the timing analysis comprises performing a separate timing analysis for one or more clock domains in the multi-clock domains by separately analyzing flows of one or more data tokens corresponding to the one or more clock domains.

14. The method of claim 10, wherein the synchronous circuit design comprises multi-clock domains, and wherein the performing of the timing analysis comprises performing a joint timing analysis for related clock domains in the multi-clock domains jointly analyzing flows of one or more data tokens corresponding to the related clock domains.

15. The method of claim 1, further comprising reporting the corresponding path as an unacceptable path.

16. The method of claim 15, further comprising improving the corresponding path by replacing the unacceptable path.

17. The method of claim 15, wherein the unacceptable path comprises at least one of a substantially long path, a substantially short path, or an imbalanced path.

18. A system comprising:
   memory to store a plurality of modules; and
   one or more processors coupled to the memory to execute the plurality of modules including:
   a conversion module to convert a synchronous circuit design into an asynchronous representation that includes a dataflow graph; and
   an identification module to identify a critical path in the asynchronous representation by performing a timing analysis on one or more paths in the dataflow graph to determine the critical path, the conversion module further operating to convert the critical path into a corresponding path in the synchronous circuit design.

19. The system of claim 18, wherein the conversion module is to generate a synchronous netlist based on the synchronous circuit design.

20. The system of claim 18, wherein the conversion module is to convert the synchronous netlist into the dataflow graph.

21. The system of claim 18, wherein the identification module is to identify a slowest path in the dataflow graph.

22. The system of claim 18, further comprising:
   a timing analysis module to perform a timing analysis of the asynchronous representation by analyzing flows of data tokens in the dataflow graph.

23. The system of claim 18, wherein the identification module is to analyze the asynchronous representation using a. technique including at least one of a Petri net, a marked graphs, or an event-rule system technique.

24. The system of claim 18, further comprising:
   a reporting module to report the corresponding path as an unacceptable path.

25. A machine-readable storage device comprising instructions, which when executed by one or more processors, perform a method comprising:
   converting a synchronous circuit design into an asynchronous representation that includes a dataflow graph;

identifying a critical path in the asynchronous representation by performing a timing analysis on one or more paths in the dataflow graph to determine the critical path;

converting the critical path into a corresponding path in the synchronous circuit design; and displaying the corresponding path on a display device.

26. The machine-readable storage device of 25, wherein the identifying of the critical path comprises performing a timing analysis including analyzing the asynchronous representation using a technique including at least one of a Petri net, a marked graphs, or an event-rule system technique.

* * * * *

UNITED STATES PATENT AND TRADEMARK OFFICE
CERTIFICATE OF CORRECTION

| | | |
|---|---|---|
| PATENT NO. | : 8,661,378 B2 | Page 1 of 1 |
| APPLICATION NO. | : 12/570629 | |
| DATED | : February 25, 2014 | |
| INVENTOR(S) | : Manohar et al. | |

It is certified that error appears in the above-identified patent and that said Letters Patent is hereby corrected as shown below:

In the Specification

In column 1, line 50, delete "than" and insert --that--, therefor

In the Claims

In column 9, line 32, in Claim 1, after "of", insert --:--, therefor

In column 9, line 58, in Claim 6, after "path", insert --in--, therefor

In column 10, line 9, in Claim 12, delete "inc hiding" and insert --including--, therefor In column 10, line 22, in Claim 14, before "jointly", insert --by--, therefor In column 10, line 56, in Claim 23, delete "a." and insert --a--, therefor In column 11, line 7, in Claim 26, before "25", insert --claim--, therefor Signed and Sealed this
Seventeenth Day of June, 2014

Michelle K. Lee
*Deputy Director of the United States Patent and Trademark Office*